US008964984B2

(12) United States Patent
Abl et al.

(10) Patent No.: US 8,964,984 B2
(45) Date of Patent: Feb. 24, 2015

(54) METHOD FOR DETECTING A SPEED VIOLATION OF A VEHICLE

(71) Applicant: Kapsch TrafficCom AG, Vienna (AT)

(72) Inventors: Alexander Abl, Viktring (AT); Stefan Rass, Klagenfurt (AT); Peter Schartner, Klagenfurt (AT); Patrick Horster, Frechen (DE)

(73) Assignee: Kapsch TrafficCom AG, Vienna (AT)

( * ) Notice: Subject to any disclaimer, the term of this patent is extended or adjusted under 35 U.S.C. 154(b) by 162 days.

(21) Appl. No.: 13/857,395

(22) Filed: Apr. 5, 2013

(65) Prior Publication Data
US 2013/0266139 A1 Oct. 10, 2013

(30) Foreign Application Priority Data

Apr. 6, 2012 (EP) .................................... 12455003

(51) Int. Cl.
| | |
|---|---|
| H04L 29/06 | (2006.01) |
| G08G 1/054 | (2006.01) |
| H04L 9/08 | (2006.01) |
| H04L 9/30 | (2006.01) |

(52) U.S. Cl.
CPC ............ *H04L 63/0428* (2013.01); *G08G 1/054* (2013.01); *H04L 9/083* (2013.01); *H04L 9/0847* (2013.01); *H04L 9/3073* (2013.01); H04L 2209/84 (2013.01)
USPC .......................................... 380/255; 380/259

(58) Field of Classification Search
CPC . H04L 63/0428; H04L 9/0847; H04L 9/3073; H04L 9/083

USPC .................................................. 380/255, 259
See application file for complete search history.

(56) References Cited

U.S. PATENT DOCUMENTS

| | | | | |
|---|---|---|---|---|
| 7,716,482 | B2* | 5/2010 | Jung et al. | 713/171 |
| 8,406,988 | B2* | 3/2013 | Schafer et al. | 701/119 |
| 2003/0189499 | A1* | 10/2003 | Stricklin et al. | 340/933 |
| 2006/0215837 | A1* | 9/2006 | Chen et al. | 380/44 |
| 2008/0059787 | A1* | 3/2008 | Hohenberger et al. | 713/153 |
| 2010/0208895 | A1* | 8/2010 | Boneh et al. | 380/278 |

FOREIGN PATENT DOCUMENTS

EP 2360647 8/2011

OTHER PUBLICATIONS

Extended European Search Report dated Sep. 25, 2012 from the European Patent Office.

* cited by examiner

*Primary Examiner* — Chau Le
*Assistant Examiner* — Muhammad Chaudhry
(74) *Attorney, Agent, or Firm* — Fiala & Weaver P.L.L.C.

(57) ABSTRACT

Detecting a speed violation of a vehicle traveling from a first roadside system to a second roadside system comprises: protecting evidence data collected at two roadside systems by encrypting each set of data with random session keys at each roadside system, and then encrypting the random session keys with a public key generated from an identity that may include a vehicle identifier and a timestamp. A ratio of the public keys is calculated and used to detect a violation, whereupon a private key is obtained for decrypting at least one of the encrypted session keys, and decrypting at least one of the encrypted evidence data with the decrypted session key.

16 Claims, 4 Drawing Sheets

METHOD FOR DETECTING A SPEED VIOLATION OF A VEHICLE

CROSS REFERENCE TO RELATED APPLICATIONS

The present application claims the priority of the European patent application no. 12455003.9 filed Apr. 6, 2012, which is hereby incorporated by reference herein.

FIELD OF THE INVENTION

Described herein are embodiments relating to methods for detecting a speed violation of a vehicle traveling from a first roadside system to a second roadside system, also called "section control".

BACKGROUND

The term section control refers to a technical system for the measurement of speeds of vehicles on road segments. Contrary to a standard speed trap, which measures the speed of a bypassing vehicle at a certain point (e.g. by means of a Doppler-radar), a section control system measures the average speed over a certain road-segment. It takes notice of the same vehicle passing two geographically distant points within a certain time. The known distance of the measurement devices, hereafter called roadside systems or gantries, in connection with the known travel time permits calculation of the average speed along the section of interest, and subsequent legal actions upon a speed limit violation.

When a section control system is implemented, particular care has to be taken regarding the protection of the identity of an observed vehicle's driver. In fact, the system must respect the driver's privacy up to the point when there is evidence of a speed limit violation. In particular, this means that the system should not store or process any personal data for purposes other than detecting a speed limit violation. Identities of drivers that behaved correctly should be protected at all times (i.e. neither be stored or processed any further).

Existing methods for section control (conf. e.g. EP 2 220 634, EP 2 360 647) rely on a comparison of hashed values of vehicle identifiers captured at the first and second roadside systems and, in case of a match, evaluating their clear-text timestamps to calculate travel time and thus the speed of the vehicle between the first and the second roadside systems. When a speed violation is detected, the vehicle identifiers captured at the outset have to be retrieved in the first and second roadside systems on the basis of the hashed values, which requires appropriate look-up tables for the captured evidence data.

The prior art systems are still inadequate regarding data protection and user privacy because the travel time of a vehicle is public, even when there is no speed violation, and because the originally captured evidence data stored in the roadside systems is prone to intruder attacks. There is therefore a need for methods for section control with improved security and privacy.

SUMMARY

Described herein are methods for detecting a speed violation of a vehicle traveling from a first roadside system to a second roadside system, comprising: setting-up private and public parameters, including a common modulo basis, of an identity based encryption (IBE) scheme in a key generation center and the first and second roadside systems; capturing at least an identifier of the vehicle and a first timestamp at the first roadside system as first evidence data, using at least the first identifier and first timestamp as a first identity to generate a first IBE public key, encrypting the first evidence data with a first random session key, encrypting the first random session key with the first IBE public key, and deleting the first evidence data and the first session key at the first roadside system; capturing at least an identifier of the vehicle and a second timestamp at the second roadside system as second evidence data, using at least the second identifier and second timestamp as a second identity to generate a second IBE public key, encrypting the second evidence data with a second random session key, encrypting the second random session key with the second IBE public key, and deleting the second evidence data and the second session key at the second roadside system; calculating a ratio of the first and second public keys, modulo the common modulo basis, and looking-up the ratio in a table of ratios pre-computed for a set of time differences between said first and second timestamps which set represents speed violations, and, when the look-up is successful: retrieving at least one IBE private key for at least one of said IBE public keys from the key generation center, decrypting at least one of said encrypted session keys with said private key, and decrypting at least one of said encrypted evidence data with said decrypted session key.

Some embodiments integrate the timestamps associated with the vehicle passing the first and second roadside systems into the first and second identities, respectively, of an IBE encryption scheme. By doing so, the travel time of a vehicle is completely concealed in cases where there is no speed violation, providing enhanced privacy. In these embodiments, the travel time may be obtained only for vehicles that were violating the speed limit and not for others.

Comparing the first and second IBE public keys performs a combined vehicle identifier (e.g. license-plate) match and speed limit (timestamp difference) violation check in a single calculation. This is a remarkable improvement over the prior art twostage checks, which first verify the equality of vehicle identifiers and upon a match compare the timestamps.

Concurrent use of the combined vehicle identifier and timestamp identities in an identity based encryption (IBE) scheme completely obscures the identities at the roadside systems and, by means of the public keys based thereon, also the underlying evidence data. This dramatically improves security over intruder attacks at the level of the roadside systems. The central key generation center of the IBE scheme can be better protected by cryptographic, technical and organizational measures than the individual roadsides systems. Each roadside system can securely encrypt identities and evidence data, and only an operator with access to the key generation center can decrypt the data in case of an actual verified speed violation.

Various embodiments described herein may have one or more of the following characteristics: (i) data collected by a roadside system is only usable in the roadside system for determining whether or not a speed limit violation has occurred; there is no semantically meaningful possibility of further processing and encrypting this data in a roadside system; (ii) evidence data related to a driver's identity is never stored permanently and can be destroyed immediately and without any traces if no speed limit violation has been discovered, and storage beyond this point in time is only permitted for those vehicles that have provably violated the speed limit; (iii) for the period in time in which the vehicle is between two roadside systems, the method ensures that there is no way of extracting the value of the vehicle identifier data field (e.g. license plate number or any drivers identity) from the data stored in the system; (iv) it is impossible to discover that the same vehicle (with or without knowing its identifier value) has passed several roadside systems, which prevents an adversary from obtaining travel profiles. Note that the term "vehicle identifier" is used interchangeably to describe the name of the data field storing a license plate value, as well as a particular license plate value.

In one embodiment, the IBE scheme is a Boneh-Franklin encryption scheme that is well-studied and has high reliability. In one embodiment, the evidence data can be encrypted at the first and/or second roadside system according to a symmetric encryption scheme, in particular according to the advanced encryption standard (AES), ensuring high security.

Security against intruder access and eavesdropping attacks can be further improved when the first and second roadside systems share at least one random or pseudorandom value that is incorporated into the first identity to generate the first IBE public key and into the second identity to generate the second IBE public key. In this way two roadside systems can be "paired", and the pairing key is a random or pseudorandom value that can optionally be changed routinely. To this end the first and second roadside systems can communicate to synchronously switch from one pseudorandom value to a subsequent pseudorandom value in a series of pseudorandom values.

According to a further embodiment, the first IBE public key is generated in the form $$PK_{1,t}:=g^{((LPN\|pad)\oplus R_i)\|t} \bmod p_G$$

with $PK_{1,t}$ being the first IBE public key,

LPN, t being the identifier and timestamp of the first evidence data, $R_i$ being the random or pseudorandom value, g, $p_G$ being public parameters of the IBE scheme, $((LPN\|pad)\oplus R_i)\|t$ being the first identity, and the second IBE public key is generated in the form:

$$PK_{1,t}:=g^{((LPN\|pad)\oplus R_i)\|t} \bmod p_G$$

with $PK_{2,t}$ being the second IBE public key,

LPN, t being the identifier and timestamp of the second evidence data, $R_i$ being the random or pseudorandom value, g, $p_G$ being public parameters of the IBE scheme, and $((LPN\|pad)\oplus R_i)\|t$ being the second identity;

and the ratio is calculated in the form:

$$PK_{2,t} \cdot PK_{1,t}^{-1} (\bmod p_G)$$

These operations can be implemented efficiently, e.g. by simple bit shifting operations on bit level, and are well-suited for real-time applications.

According to further embodiments, the first evidence data may comprise a picture of the vehicle taken with a camera at the first roadside system; and/or the second evidence data may comprise a picture of the vehicle taken with a camera at the second roadside system; and/or the first evidence data is cryptographically signed with a signature key of the first roadside system; and/or the second evidence data is cryptographically signed with a signature key of the second roadside system.

In various embodiments, the first and second IBE public keys, the encrypted first and second session keys and the encrypted first and second evidence data can be deleted if desired after a predetermined period of time. This period can, e.g., be set to the maximum travel time it takes for a vehicle with minimum speed-violating travel speed to travel from the first to the second roadside system.

In further embodiments, the first evidence data may comprise a class of the vehicle captured at the first roadside system. In this case, different tables of IBE public key ratios representative of speed violations can be pre-computed for different classes of vehicles, and the table used for the look-up is chosen according to the captured class of the vehicle.

Alternatively or additionally the first or second evidence data may comprise a weather or road condition captured at the first or second roadside system, different tables of ratios are pre-computed for different weather or road conditions, and the table used for the look-up is chosen according to the captured weather or road condition.

The steps of calculating the ratio of the first and second IBE public keys, the subsequent looking-up of the ratio in the pre-computed ratio table and all further steps in case of a speed violation can be performed in either of the first and second roadside systems. To this end, the first IBE public key may be sent to the second roadside system, or the second IBE public key may be sent to the first roadside system, for calculating the ratio.

BRIEF DESCRIPTION OF THE FIGURES

Further details, features and advantages of the invention will now become apparent from the following description of numerous embodiments thereof with reference to the accompanying drawings, in which.

DETAILED DESCRIPTION OF EMBODIMENTS

In the description of the example below, the following components and information are available to the system: (i) The vehicle class (including single-track and two-track vehicles); (ii) The current weather and road-conditions, which determine the currently valid speed limit for a specific vehicle class and a given section; (iii) Synchronized clocks throughout the system with a precision of less than 0.01 sec; (iv) The roadside systems include roadside cabinets for the electronic equipment, gantries (or any other facilities to affix cameras, e.g. bridges, tunnel portals, poles etc.), which are equipped with cameras that are capable of embedding a timestamp in the picture.

In addition, the roadside system includes a camera to either display via a photo or to otherwise provide the following information: (i) The face of the driver (insofar legal regulations permit this); (ii) A unique identification token of the roadside system where the picture has been taken (i.e. a proof of origin of the picture). (iii) The license-plate number as the value of the vehicle identifier; (iv) The current traffic and weather conditions, including the position and lane of all relevant vehicles; (v) A vehicle class detector; (vi) Other information like the geographical location, roadside system identifier, lane and direction of driving.

The aforementioned information is available reliably for vehicles passing the roadside system at a speed of up to 250 km/h. The systems of various embodiments described herein may also include the following components and/or configurations: (i) All connections between any two entities in the system are SSL-protected, i.e. encrypted and authenticated. State-of-the-art algorithms and key-lengths are employed; (ii) A central authority, the key-generation center, exists that is protected by cryptographic, technical and organizational measures. In particular, any staff working within this high-security domain is trustworthy and any physical access to the respective facilities or data is subject to at least a four-eyes principle; (iii) Any communication between any two entities in the system uses unique serial numbers to link answers to respective requests (we therefore not explicitly mention the serial number in the subsequent messages and assume it available implicitly).

Figure 1:
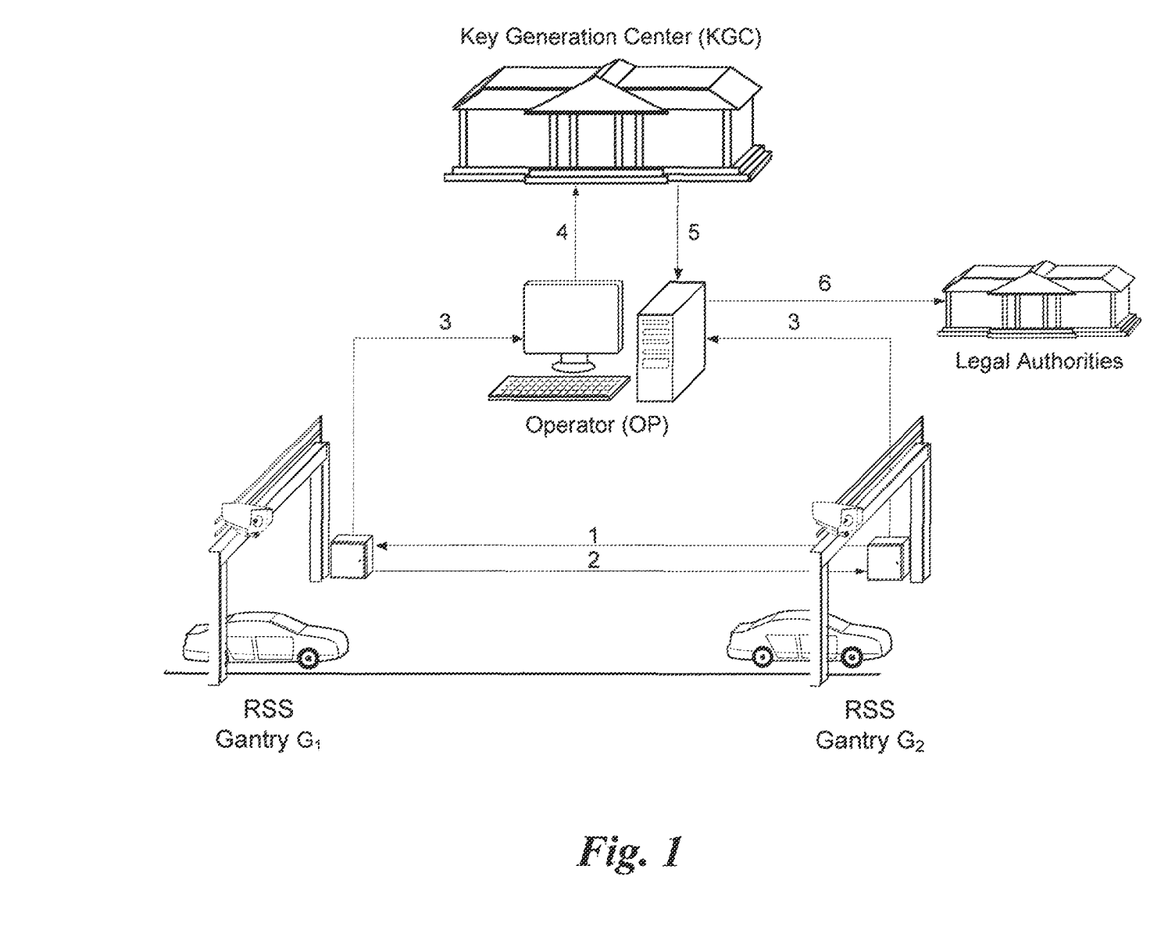
FIG. 1 is a block diagram of the high level architecture of the components used in one embodiment of a method described herein.

The high-level architecture (HLA) is displayed in FIG. 1. Its main components are the following: Roadside systems (RSS), which include two roadside system gantries $G_1$, $G_2$, both of which are equipped with cameras. Each such roadside system gantry may be configured with a tamper-proof device (such as a hardware dongle, smartcard, trusted element or cryptoprocessor); Operator (OP), which may be the only entity in the system capable of seeing the entire evidence referring to a speed limit violation suspect. Its function includes checking the correctness of the suspected violation and—in case of a violation—passing the evidence onwards to the legal authorities; Key generation center (KGC), wherein the key generation center's role is generating the decryption keys for the encrypted evidence upon a signed request from the operator. The necessary hardware and software resides in a high-security domain; Legal Authorities, which are generally not directly part of the technical concept and therefore receive no further discussion in this document.

Figure 2:
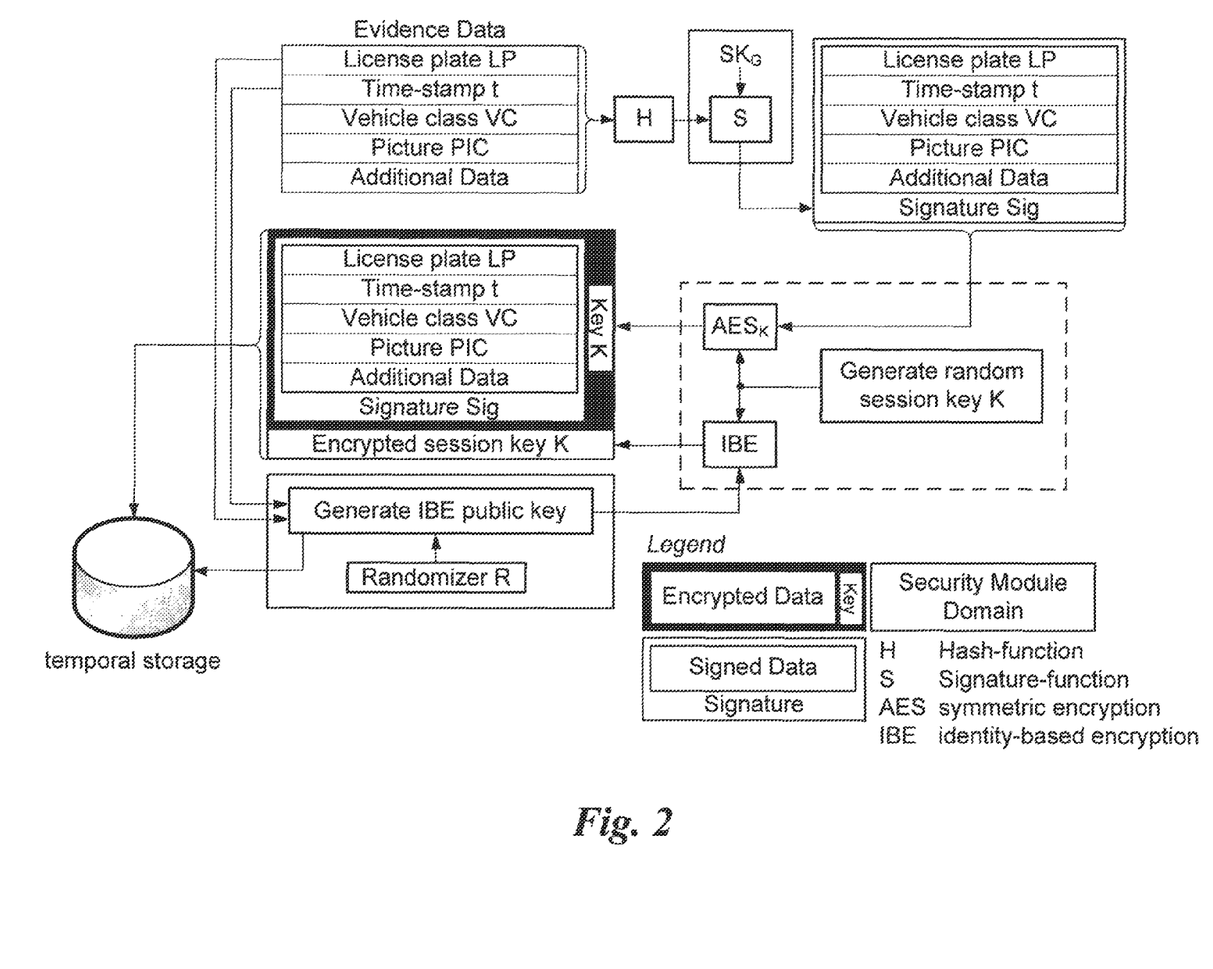
FIG. 2 is a flowchart of evidence data preparation and encryption steps in either of the first and second roadside systems within various methods of the described embodiments.
Figure 3:
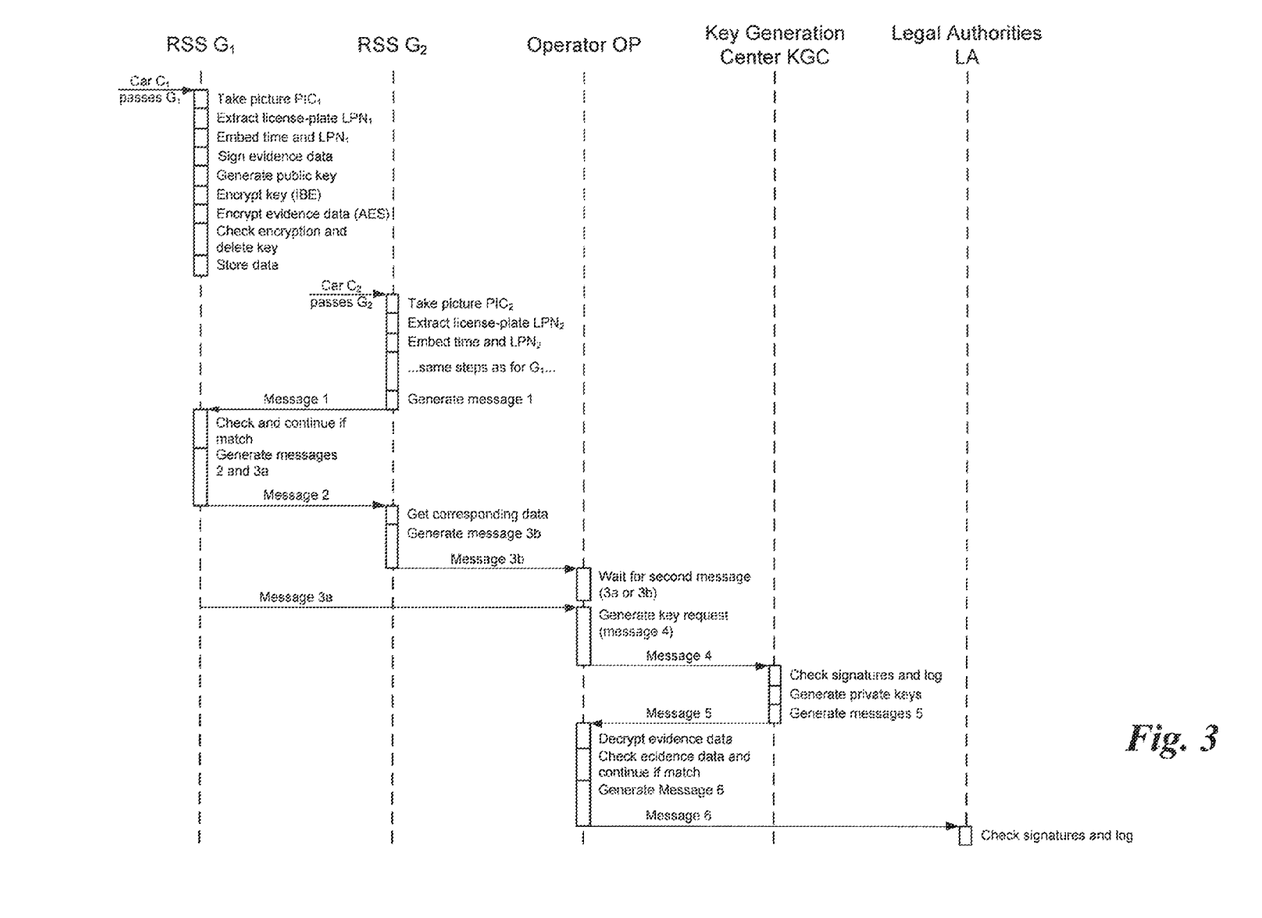
FIG. 3 is a sequence diagram of one example method of the described embodiments.

Following is a description of one embodiment of an overall process according to the information flows displayed in FIGS. 1-3. The process starts when a vehicle passes the first roadside system gantry $G_1$.

The roadside system at gantry $G_1$ notices a vehicle and executes the following: Collect all information required for potential legal action. This may include one or more of: (i) A picture PIC of the vehicle. From the picture, it obtains the license-plate number LPN by means of optical character recognition (OCR). Alternatively, the license-plate number can be replaced or augmented by any identification feature of the vehicle (such as signals from RFID-tokens, color, etc.). Without loss of generality, we shall refer to any unique identification feature of a vehicle as its "license-plate number" throughout the remainder of this document, although this means the value of the vehicle identifier in general; (ii) The vehicle class VC (car, heavy-goods vehicle, etc.); (iii) A timestamp t (according to the assumptions stated above, we assume synchronized clocks throughout the entire system); (iv) Additional data AD as required, e.g. the current weather- and road-conditions on the section between $G_1$ and $G_2$. This respective information is assumed available to both gantries, $G_1$ and $G_2$.

From its collected data, it creates the evidence dataset as the record D=(LPN, t, VC, P/C, AD, Sig), where Sig is a digital signature of all evidence data. This can be a standard Rivest-Shamir-Adleman (RSA)-signature, taking the roadside system's secret signature key $SK_G$ to produce Sig from the data (LPN, t, VC, P/C, AD). It can be verified by the operator who authentically knows the respective public key $PK_G$ of the roadside system. This is desirable to avoid attacks that are based on submitting faked evidence data to the operator.

The roadside system creates a fresh random 128 Bit session key $K \in \{0, 1\}^{128}$ and encrypts D by means of AES (advanced encryption standard) giving the encrypted data ED=AES (D, K). Longer session keys are permissible.

The roadside system encrypts the session key K by means of identity-based encryption (IBE). An embodiment of the IBE scheme is the Boneh-Franklin encryption scheme described in D. Boneh and M. Franklin: *Identity based encryption from the Weil pairing*. SIAM J. of Computing, 2003, 32, pp. 586-615; and L. Martin: *Introduction to Identity-Based Encryption*, Artech House, 2008, the disclosures of which are herein incorporated by reference.

The respective public key $PK_{1,t}$ of the IBE scheme is created (e.g. within a tamper-proof device) as:

$$PK_{1,t} := g^{((LPN\|pad) \oplus R_i)\|t} \bmod p_G \qquad (1)$$

where $\|$ denotes the simple bitstring-concatenation, and $\oplus$ is the bitwise XOR operation. The parameter $p_G$ is a prime number that is selected sufficiently large to ensure that the discrete logarithm problem is hard (see Table 6). As known to those of skill in the art, the term $((LPN\|pad) \oplus R_i)\|t$ is one example of an embodiment of the "identity" of the IBE scheme. The remaining inputs and parameters are as follows:

g is a generating element of the IBE scheme, here the generating element of the finite group $Z_{p_G}^*$ (the set of integers modulo the prime $p_G$) with multiplication modulo $p_G$. Its bit-length can be chosen as recommended in Table 5.

pad is any suitable padding string to get the desired bit-length in the exponent. Neither its concrete choice nor its secrecy has an impact on the security of the system. Hence, this value can be chosen fixed throughout the entire system. In particular, all roadside systems can use the same padding.

t is the UNIX (or POSIX) time-stamp when the vehicle passed the roadside system gantry. This is the number of seconds elapsed since midnight coordinated universal time (UTC) of Jan. 1, 1970, not counting leap seconds. This value is by default available on any UNIX- or Linux-based computing platform.

$R_i$ is the currently valid randomizer (pseudorandom bit-string) that each roadside system creates on its own. This value can be set individually and independently random for each pair of roadside systems, and can be changed periodically (see below). The bitwise XOR of $R_i$ with the license-plate number (and padding) thwarts brute-force attacks to disclose the driver's identity. Its generation and synchronization with its neighboring roadside system is discussed later on.

We explicitly remark that the term randomizer henceforth refers to a pseudorandom value (bitstring), rather to the algorithm that creates it (the latter being referred to as a pseudorandom number generator).

Using $PK_{1,t}$, the first roadside system of a section pair encrypts the session key to obtain EK=IBE (K, $PK_{1,t}$). The session-key K and the evidence data D (its plain text) are destroyed immediately and permanently after encrypting it.

The roadside system temporarily stores the encrypted session key EK, the public key $PK_{1,t}$ and the encrypted evidence data ED in its storage (e.g. hard disk). Depending on the vehicle class and the speed limit that applies to it under the current weather and road-conditions, this entire record is permanently destroyed after a period of $\Delta T$ time units (e.g. seconds).

The "aging" of public keys does not require an absolute timestamp, but can be implemented with a counter that is decremented periodically and deleted as soon as it reaches zero (similarly to a time-to-live field).

Example (calculation of ΔT): Assume that $G_1$ and $G_2$ are 5 km apart and that the speed limit is 130 km/h on this section. In this case, a vehicle may not pass $G_2$ sooner than $$\Delta T = \frac{5 \text{ km}}{130 \text{ km/h}} \cdot 3600 \approx 138.46 \text{ s}$$

after it has passed $G_1$. Otherwise, a speed limit violation must have occurred.

Gantry $G_1$ creates a list of public keys for subsequent look-up requests from gantry $G_2$ (or vice versa). This list can be cleared from outdated public-keys (temporal storage), i.e. those that are older than ΔT. A key can be stored along with the time of its creation, i.e. a record can be e.g. of the form $(PK_{1,t})$.

FIG. 2 displays the details of step 1 graphically. It is, in general, advisable to perform all cryptographic operations within the security module domain. However, for performance reasons, AES- and IBE-encryption can be done outside the security module (boundary shown as a dashed line in FIG. 2), provided that the session key K is destroyed reliably after encrypting the data D and concealing it via IBE.

Roadside system gantry $G_2$ notices a passing vehicle at (a later) time t. It performs the same steps as $G_1$ does. In addition, it submits $(t, PK_{2,t})$, along with additional data (vehicle class, road conditions, weather conditions, etc.) as required, to $G_1$, see message 1 (or vice versa). Alternatively, it is possible to send only the public key along with one additional bit (to indicate which randomizer to use for checking in step 3, see below, within a period of ΔT after switching), so as to avoid sending a timestamp (see further details below).

At time t'>t, roadside system $G_1$ receives $(t, PK_{2,t})$ from $G_2$. Roadside system $G_1$ filters its list of public keys and selects a set of n entries, which are relevant for comparison with $PK_2$. We denote this (shortened and renamed) list as $\{PK_{1,1}, PK_{1,2}, \ldots, PK_{1,n}\}$. The check is performed by calculating $$V \equiv PK_{2,t} \cdot PK_{1,j}^{-1} (\bmod p_G) \qquad (2)$$
$$\equiv g^{[((LPN_2 \| pad) \oplus R_i) \| t]} g^{-[((LPN_j \| pad) \oplus R_i) \| t_j]} (\bmod p_G)$$
$$\equiv g^{x \| y} (\bmod p_G)$$

for all indices j=1, 2, . . . , n, and where y has the same bit-length as the timestamps. The products $PK_{2,t} \cdot PK_{1,j}^{-1}$ (mod $p_G$) can be determined using standard programming libraries for modulo arithmetic and the resulting value V is looked up in a pre-computed table.

The pre-computed lookup-table stores pairs (V, time-difference) of the form displayed in Table 1, where ΔT is the time for a travel from $G_1$ to $G_2$ at maximal permitted speed for the slowest vehicle class (e.g. 139 seconds for a 5 km distance at speed 130 km/h). Notice that Table 1 can be pre-computed and stored as a hash-table (for fast access) in the roadside system's hardware. Physically impossible values like 0 do not need to be included in the table. Furthermore, for better performance, it is advisable to store more likely time-differences first and unlikely timedifferences last when filling the table initially. Alternatively, the hash-table lookup can be replaced by a binary search within a pre-sorted table (at the cost of getting logarithmic running time for the table-lookup).

TABLE 1

Pre-computed values for speed limit checking

| V | Time-Difference |
|---|---|
| $g^0 \text{MOD} p_g$ | 0 |
| $g^1 \text{MOD} p_g$ | 1 |
| $g^2 \text{MOD} p_g$ | 2 |
| . | . |
| . | . |
| . | . |
| $g^{\Delta T} \text{MOD} p_g$ | ΔT |

For efficiency reasons, $G_2$ can send $(t, PK_{2,t}^{-1})$ to $G_1$ and have $G_1$ compute and look-up $PK_{2,t}^{-1} \cdot PK_{1,j}$ in its table (or vice versa). The contents of Table 1 have to be altered accordingly.

If the table-lookup comes back negative, i.e. the value $V=PK_{2,t} \cdot PK_{1,j}^{-1}$ has not been found, then x∥y>ΔT. This indicates that either x≠0, so that $LPN_2 \neq LPN_j$, i.e. the license-plate numbers are different, or otherwise x=0 (meaning identical license-plate values) and $y=t-t_j>\Delta T$, so that no speed limit violation has happened. In either case, we have no suspect of a violation. In particular, this means that the comparison can practically never yield false-negative alarms.

If the table-lookup came back positive, then the value $V=g^t$ (x∥y) has been found, and the value x∥y can be obtained from the table-lookup ("Time-Difference"-column). Observe that the table may only store records for time-differences up to ΔT. Notice that the randomizers within $PK_2$ and $PK_{1,j}$ can be assumed identical by virtue of synchronization (cf. below).

The likelihood of a false-positive may be approximated as follows: Let N be the number of entries in Table 1. This value depends on ΔT (e.g. for ΔT=139 seconds and a time-measurement with an accuracy of 0.01 seconds, we get N≈13900 entries in the table). The probability for a false-positive is roughly $$\frac{N}{2^{bitlength(p_G)}} = \frac{N}{2^{160}} \approx 10^{-44}$$

and thus is negligible. So upon a positive table-lookup, we have overwhelmingly strong evidence that the same vehicle has passed both roadside systems within a time shorter than ΔT. This indicates a speed limit violation, which can be passed on to an operator for a manual second check. As far as it regards the automatic checking via the table-lookup, there are practically no false-positive alarms.

If a speed limit violation is detected in this way, then $G_1$ responds to $G_2$ accordingly, see message 2 in FIG. 1 (or vice versa, if the table look-up had been made at $G_2$), and both send their encrypted evidence data $ED_1$, $ED_2$, public keys $PK_1$, $PK_2$, encrypted session keys $EK_1$, $EK_2$ and the respective roadside system gantryIDs $GID_1$, $GID_2$ to the operator. Messages 3 in FIG. 1 (3a and 3b in FIG. 3) are sent from $G_i$ to the operator, and are—for i=1, 2—of the form $(PK_i, EK_i, ED_i, GID_i, H(PK_1 \| PK_2))$, where the last entry $H(PK_1 \| PK_2)$ establishes an optional link between the two messages from both roadside systems. The function H is a cryptographically secure hash-function. The operator can acknowledge both messages by sending a short notification to the roadside systems (to prevent an adversary from blocking this conversation in order to hide a speed limit violation). The correct response from $G_1$ to $G_2$, message 2 (or vice versa) is formed by sending ($PK_2$, response) with response $\epsilon\{yes,no\}$ to $G_2$, which assures that $G_2$ can correctly relate the response to a former query (or vice versa).

The operator transmits ($PK_1$, $PK_2$) to the key generation center and digitally signs his entire request with his secret signature key $SK_{sig,op}$ (message 4). Upon successful signature verification, the key generation center calculates the decryption keys $SK_1$, $SK_2$ referring to $PK_1$, $PK_2$. Observe that these decryption keys do neither exist elsewhere in the system nor prior to a suspected speed limit violation. The key generation center encrypts the record ($SK_1$, $SK_2$) with the operator's public key $PK_{op}$ and sends an RSA-ciphertext C=RSA (($SK_1$,$SK_2$),$PK_{op}$) back to the operator (message 5).

The operator decrypts C with his secret key $SK_{op}$ and extracts $SK_1$, $SK_2$. These are required to decrypt the session keys $EK_1$, $EK_2$ to obtain the AES-keys $K_1$, $K_2$, which are used to decrypt the evidence data $D_1$, $D_2$. After a manual check for a correctly indicated speed limit violation the evidence data can be forwarded to the legal authorities (message 6).

FIG. 3 displays the whole process as a sequence diagram.

The process described so far refers to a single vehicle class and optimal road conditions. Depending on the weather conditions and vehicle class, different speed limits may apply. This amounts to using a different parameter $\Delta T$ when doing the table-lookup upon a request from $G_2$ (or $G_1$). There are two basic ways to implement this. In one embodiment, the system may Pre-compute Table 1 up to the maximum $\Delta T$ of all vehicle classes, and do the look-up to get the actual travel time (or get a "not found" if the travel time was longer than implied by the lowest speed limit on this section). For instance, if a heavy-goods vehicle is limited to 60 km/h (giving $\Delta T_{HGS}$=300 s) and a car may drive at up to 130 km/h (giving $\Delta T_{car}$=138 s), then the table is computed up to values $g^{\Delta T}$ with $\Delta T=\max\{\Delta T_{HGS}, \Delta T_{car}\}$=300 s. This determines the size of the table, and the vehicle class (transmitted as additional data in the query) can be used to decide later, whether the speed limit violation has actually occurred, if the look-up came back positive.

In an alternative embodiment, a different look-up table (Table 1) can be computed specifically for each vehicle class and speed limit. In that case, the transmitted vehicle class determines which table is used for the look-up by RSS. This avoids the additional check required by the single-table approach and is faster because fewer entries have to be searched for each query. Moreover, this hides travel times of vehicles that have been found in the table, but have not committed a speed-limit violation with respect to their specific vehicle class.

During the system set-up phase, each pair of roadside systems (gantries) can optionally receive a shared randomizer i.e. a random or pseudorandom value. For security, a particular randomizer $R_0$ should not be shared by more than two roadside systems.

Particular care has to be taken when changing the randomizer. Let us call the initial randomizer $R_0$ within both roadside system gantries $G_1$, $G_2$ (established during the system initialization). Within e.g. a tamper-proof device (such as a hardware dongle, smartcard, trusted element, cryptoprocessor et cet.), we generate the next randomizer by hashing the last one, i.e. $R_{i+1}=H(R_i)$.

The randomizer should not leave the tamper-proof device nor be accessible in any way from outside, hence equation (1) should be evaluated within the tamper-proof device. Storing the randomizer externally—if needed—should be done in an encrypted fashion.

Figure 4:
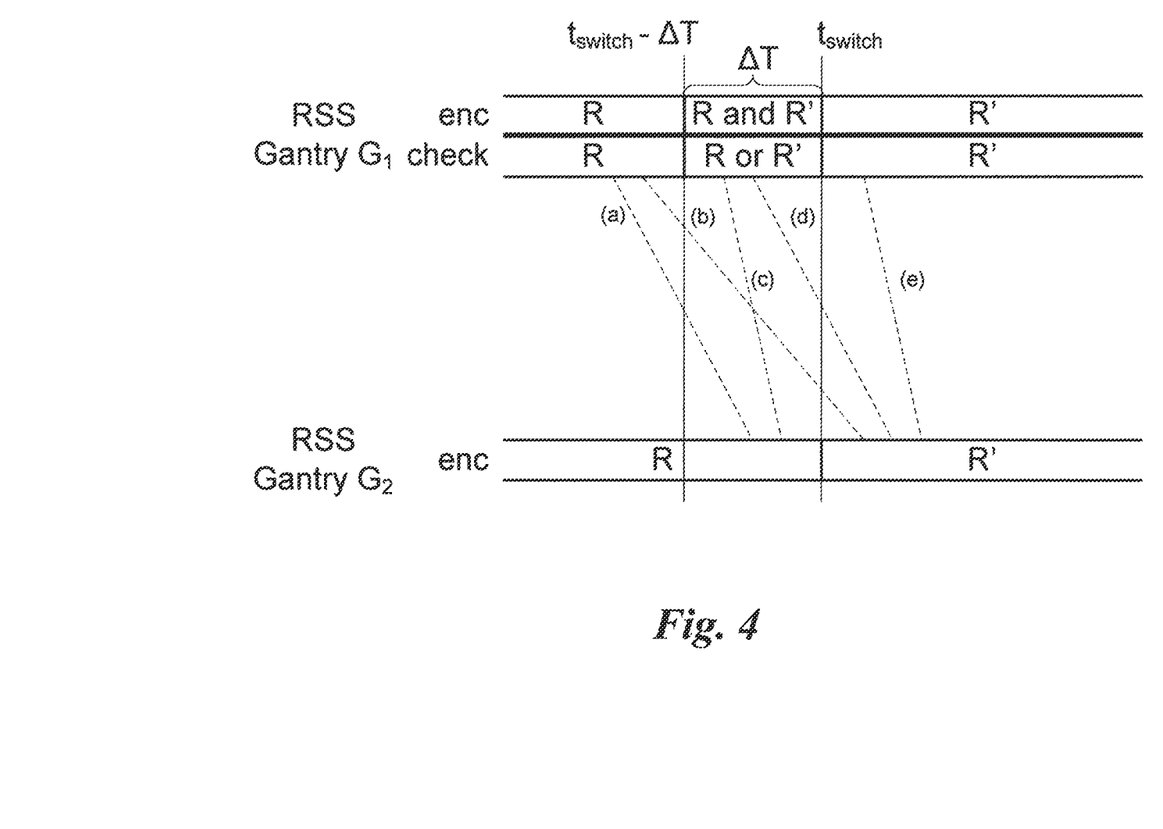
FIG. 4 is a sequence diagram of the usage and switching of pseudorandom values of a pseudorandom values series between the first and second roadside systems.

Table 2 in connection with FIG. 4 explains which randomizers are used by $G_1$, $G_2$ for creating the public keys ("encrypt") and which randomizer is used by $G_1$ (or $G_2$) when searching its look-up table upon a request from $G_2$ (or $G_1$) ("check").

TABLE 2

Randomizer Usage for Public-Key Creation and Checking

| Arrival time at RSS gantry $G_1$ | Arrival time at RSS gantry $G_2$ | |
| --- | --- | --- |
| | Before $t_{switch}$ | After $t_{switch}$ |
| Before $t_{switch} - \Delta T$ | Case (a)<br>encrypt $G_1$: R,<br>encrypt $G_2$: R<br>check: R | Case (b)<br>encrypt $G_1$: R,<br>encrypt $G_2$: R'<br>check: $G_1$ would check with R' but has deleted the respective public-key by that time, so no speed limit violation has occurred (travel time > $\Delta T$) |
| Between $t_{switch} - \Delta T$ and $t_{switch}$ | Case (c)<br>encrypt $G_1$: R and R',<br>encrypt $G_2$: R'<br>check: R | Case (d)<br>encrypt $G_1$: R and R',<br>encrypt $G_2$: R'<br>check: R' |
| After $t_{switch}$ | impossible | Case (e)<br>encrypt $G_1$: R',<br>encrypt $G_2$: R'<br>check: R' |

Switching the randomizers may be done periodically in some embodiments, provided that the validity period of a randomizer is greater than $\Delta T$ in order to avoid synchronization problems. During startup or after a power-failure, $G_1$ and $G_2$ could use an authenticated SSL connection to secretly agree on a fresh initial randomizer $R_0$ and start the hash-chain all over again. This can be done using the standard Station-to-Station protocol such as the Diffie-Hellman Key-exchange. However, this synchronization "from scratch" might only be needed once in a while, e.g. after a power-failure, and is not required to happen very frequently. Alternatively, a manual key-exchange (storage of the new $R_0$ on a smartcard and copy it from the smartcard into both RSSs) after a power-failure is as well possible. This avoids the need to store designated cryptographic keys for synchronization in each roadside system.

All traffic from the operator to the KGC can be digitally signed. Notice that it is not required to digitally sign messages 3 from the gantries to the operator, since each roadside system has signed its encrypted evidence data in first instance. This means that no faked evidence data will be accepted for processing by the operator. The respective signature key can be stored in a tamper-proof device. The operator's secret key is protected by a PIN-code to prevent the adversary having compromised the operator's hardware from accessing the key, since the operator's signature key is inaccessible without the PIN.

The management of SSL-related keys is up to the particular SSL protocol stack implementation. State-of-the-art key-lengths and algorithms can be employed to this end.

For each component of the system, Table 3 lists the key that it stores, along with the recommended protection for the particular key. The IBE system parameters are assumed authentically known to each component.

TABLE 3

Overview of cryptographic keys

| Component | Key/Data Item | (Cryptographic) Protection |
|---|---|---|
| Roadside System Operator | Secret signature key $SK_G$ | Confidential (inside a tamper-proof device) |
| | Roadside system's public key(s) $PK_G$ | Authentic (certified) |
| | Secret signature key $SK_{sig, op}$ | Confidential (inside a tamper-proof device, access is PIN-protected |
| | Secret decryption key $SK_{op}$ | Confidential (same as $SK_{sig, op}$) |
| Key-Generation Center | Operators public encryption key $PK_{op}$ | Authentic (certified) |
| | Operators public signature verification key $PK_{sig, op}$ | Authentic (certified) |

Table 4 gives a list of system parameters, respective descriptions, owners and visibility of each parameter. For conciseness, we refrain from explicitly listing the specific parameters for each cryptosystem in charge. We propose using RSA and AES to encrypt channels and to use Digital secure standard (DSS) to create digital signatures, although other encryption and authentication standards known in the art could be used. The respective parameters are implicitly listed in Table 4 through the presence of the respective public and secret keys. All parameters, regardless of their visibility, should be authentic at best in order to thwart attacks based on parameter manipulation.

TABLE 4

System Parameters

| Parameter | Semantics and Description | Owner | Visibility |
|---|---|---|---|
| $PK_G$ | Public signature key of each roadside system. Needed to authenticate data submitted to the operator for verification | Roadside system (specific for each gantry) | Public |
| $SK_G$ | Secret signature creation key of a roadside system. Needed to digitally sign any payload handed over to the operator. | Roadside system (specific for each gantry) | Secret |
| $PK_{op}$ | Public encryption key of the operator. Used by the KGC to secretly deliver a secret key upon a request. | Operator | Public |
| $SK_{op}$ | Secret decryption key of the operator. Used to decipher the encrypted secret key for IBE. | Operator | Secret |
| $PK_{sig, op}$ | Public signature key of the operator. Used to verify the authenticity of queries to the KGC. | KGC | Public |
| $SK_{sig, op}$ | Secret signature key of the operator to authenticate queries to the KGC. | Operator | Secret |
| $p_G$ | A prime number to create encryption keys within a roadside system | Roadside system (same for all cooperating gantries) | Public |
| g | Generating element of the finite group $Z°_{PG}$ with modulo multiplication. | Every (cooperating) component in the system | Public |
| IBE System parameters | See D. Boneh and M. Franklin, l.c. | Roadside system (same for all cooperating gantries) and the key-generation center | Public, except for the KGC master-key. |

In one embodiment, the following key-sizes and parameter constraints of Table 5 may be used, although they are not mandatory (in general, a number n has bit-length t if $2^{t-1} \leq n < 2^t$).

TABLE 5

Recommended Key Sizes (Security parameter t)

| Cryptosystem | Parameter constraints |
|---|---|
| RSA encryption | Primes p, q of minimum bit-length t = 2048 Bit (NIST recommendation) |
| DSA Digital Signatures | Primes p, q where p has minimal bit-length t = 1024 Bit and q has minimal bit-length t = 160 Bit |
| Identity Based Encryption Finite group $Z°_{PG}$ | Prime q with bit-length at least t = 160 Bit Prime $p_G$ with bit-length at least t = 160 Bit |

As far as identity based encryption (IBE) is concerned, apart from the above recommended key-sizes no other constraints on the curves (such as minimal class number or others) used for digital signatures apply since we deal with encryption and not with signatures of the Boneh-Franklin scheme. Nevertheless, we recommend the key-sizes used for signatures to be used as well for IBE.

In general, it is advisable to ensure that the discrete logarithm or factorization problem in the group that we are using is hard. The bit-strength b measures the efforts of factorizing an integer or finding a discrete logarithm, compared to a brute-force search over a set of $2^b$ values. Hence, an example interpretation of Table 6 is the following: The last row in the table tells that finding a discrete logarithm modulo a prime of at least 256 Bit size (using Pollard's rho-algorithm, cf. A. Menezes, P. C. van Oorschot and S. Vanstone: *Handbook of applied Cryptography*, CRC Press LLC, 1997) is equally difficult as brute-force breaking trying all $2^{128}$ keys to a symmetric cipher, or equivalently hard as factoring an integer with 3072 Bit. Comparing the values in Table 5 to the recommendations given by Table 6, we recommend the latter sizes for security, since these agree with standardized recommendations, yet provide better long-term security:

TABLE 6

Equivalent cryptographic strength provided by different algorithms

| Bit-strength | Size of group (prime) | Size of Integer or Finite Field |
|---|---|---|
| 80 | 160 | 1024 |
| 112 | 224 | 2048 |
| 128 | 256 | 3072 |
| 192 | 384 | 7168 |
| 256 | 512 | 15360 |

The invention is not limited to the shown embodiments, but encompasses all variants and modifications that are covered by the scope of the accompanying claims.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method for detecting a speed violation of a vehicle traveling from a first roadside system to a second roadside system, comprising:
    setting-up private and public parameters, including a common modulo basis, of an identity based encryption (IBE) scheme in a key generation center and the first and second roadside systems;
    capturing first evidence data comprising a first identifier of the vehicle and a first timestamp at the first roadside system, using a first identity comprising the first identifier and the first timestamp to generate a first IBE public key, encrypting the first evidence data with a first random session key, encrypting the first random session key with the first IBE public key, and deleting the first evidence data and the first session key at the first roadside system;
    capturing second evidence data comprising a second identifier of the vehicle and a second timestamp at the second roadside system, using a second identity comprising the second identifier and the second timestamp to generate a second IBE public key, encrypting the second evidence data with a second random session key, encrypting the second random session key with the second IBE public key, and deleting the second evidence data and the second session key at the second roadside system;
    calculating, by at least one hardware device, a ratio of the first and second public keys, modulo the common modulo basis, and looking-up the ratio in a table of ratios pre-computed for a set of time differences between said first and second timestamps which set represents speed violations, and, when the look-up is successful: retrieving at least one IBE private key for at least one of said IBE public keys from the key generation center, decrypting at least one of said encrypted session keys with said private key, and decrypting at least one of said encrypted evidence data with said decrypted session key.

2. The method of claim 1, wherein the IBE scheme is a Boneh-Franklin encryption scheme.

3. The method of claim 1 wherein the evidence data is encrypted with the session key according to a symmetric encryption scheme.

4. The method of claim 3, wherein the symmetric encryption scheme is the advanced encryption standard.

5. The method of claim 1 wherein the first and second roadside systems share at least one random or pseudorandom value, and wherein the first identity and the second identity further comprise the at least one random or pseudorandom value.

6. The method of claim 5, wherein the first IBE public key is generated in the form $$PK_{1,t} := g^{((LPN \| pad) \oplus R_i) \| t} \bmod p_g$$

with
    $PK_{1,t}$ being the first IBE public key,
    LPN, t being the identifier and timestamp of the first evidence data,
    $R_i$ being the random or pseudorandom value,
    g, $p_G$ being public parameters of the IBE scheme,
    $((LPN \| pad) \oplus R_i) \| t$ being the first identity, and the second IBE public key is generated in the form $$PK_{2,t} := g^{((LPN\|pad)\oplus R_i)\|t} \bmod p_G$$

with
- $PK_{2,t}$ being the second IBE public key,
- LPN, t being the identifier and timestamp of the second evidence data,
- $R_i$ being the random or pseudorandom value,
- g, $p_G$ being public parameters of the IBE scheme, and
- $((LPN\|pad)\oplus R_i)\|t$ being the second identity.

7. The method of claim 6, wherein the ratio is calculated in the form $$PK_{2,t} \cdot PK_{1,t}^{-1} (\bmod p_G).$$

8. The method of claim 5 wherein the first and second roadside systems communicate to synchronously switch from one pseudorandom value to a subsequent pseudorandom value in a series of pseudorandom values.

9. The method of claim 1 wherein the first evidence data further comprises a picture of the vehicle taken with a camera at the first roadside system, and the second evidence data further comprises a picture of the vehicle taken with a camera at the second roadside system.

10. The method of claim 1 wherein the first evidence data is cryptographically signed with a signature key of the first roadside system, and the second evidence data is cryptographically signed with a signature key of the second roadside system.

11. The method of claim 1 wherein the session key has at least 128 bits.

12. The method of claim 1 wherein the first and second IBE public keys, the encrypted first and second session keys and the encrypted first and second evidence data are deleted after a predetermined period of time.

13. The method claim 1 wherein the first evidence data further comprises a class of the vehicle captured at the first roadside system.

14. The method of claim 13 wherein different tables of ratios are pre-computed for different classes of vehicles and the table used for the look-up is chosen according to the captured class of the vehicle.

15. The method of claim 1 wherein at least one of the first or second evidence data further comprises a weather or road condition captured at the first or second roadside system, and wherein different tables of ratios are pre-computed for different conditions and the table used for the look-up is chosen according to the captured condition.

16. The method of claim 1 wherein the first IBE public key is sent to the second roadside system or the second IBE public key is sent to the first roadside system for calculating the ratio.

* * * * *

UNITED STATES PATENT AND TRADEMARK OFFICE
CERTIFICATE OF CORRECTION

PATENT NO. : 8,964,984 B2
APPLICATION NO. : 13/857395
DATED : February 24, 2015
INVENTOR(S) : Alexander Abl et al.

It is certified that error appears in the above-identified patent and that said Letters Patent is hereby corrected as shown below:

In the Claims

In column 15, line 2, In Claim 6, delete " $PK_{2,t} := g^{((LPN||pad) \oplus R_i)||t} \mod p_G$ " and insert -- $PK_{2,t} := g^{((LPN||pad) \oplus R_i)||t} \mod p_G$ --, therefor.

In column 16, line 10, In Claim 13, after "method" insert -- of --.

Signed and Sealed this
Eighteenth Day of August, 2015

Michelle K. Lee
*Director of the United States Patent and Trademark Office*